(12) United States Patent
Caldera et al.

(10) Patent No.: US 6,718,020 B2
(45) Date of Patent: Apr. 6, 2004

(54) SWITCHABLE POTS SPLITTER

(75) Inventors: Peter Caldera, Villach (AT); Roland Haeusler, München (DE)

(73) Assignee: Infineon Technologies AG, Munich (DE)

(*) Notice: Subject to any disclaimer, the term of this patent is extended or adjusted under 35 U.S.C. 154(b) by 68 days.

(21) Appl. No.: 10/122,164

(22) Filed: Apr. 12, 2002

(65) Prior Publication Data

US 2003/0194066 A1 Oct. 16, 2003

(51) Int. Cl.[7] .............................................. H04M 11/00

(52) U.S. Cl. .............................. 379/93.14; 379/90.01; 379/399.01

(58) Field of Search .......................... 379/93.05, 93.07, 379/93.08, 93.14, 399.01, 399.02

(56) References Cited

U.S. PATENT DOCUMENTS

| | | | | |
|---|---|---|---|---|
| 6,144,733 A | * | 11/2000 | Amrany et al. | 379/399.01 |
| 2002/0131568 A1 | * | 9/2002 | Chea, Jr. et al. | 379/93.14 |
| 2002/0181697 A1 | * | 12/2002 | Bolla et al. | 379/399.01 |
| 2003/0031312 A1 | * | 2/2003 | Elo | 379/399.01 |

* cited by examiner

*Primary Examiner*—Stella Woo
(74) *Attorney, Agent, or Firm*—Jenkins & Wilson & Taylor, P.A.

(57) ABSTRACT

Switchable POTS-splitter for separating a voice signal from a data signal having a high pass filter for the data signal and a low pass filter for the voice signal and for a ringing signal which is generated by a ringing signal generator of a central office and switched by means of a signal feeding switch to the low pass filter for a transmission to a remote transmission unit via a ring line, wherein the low pass filter comprises at least one capacitor and a corresponding capacitor switch for switching said capacitor to the ring line when the ringing signal is transmitted.

9 Claims, 3 Drawing Sheets

SWITCHABLE POTS SPLITTER

The invention refers to a switchable POTS splitter within a central office for separating a voice signal from a data signal and in particular to a POTS splitter for an asymmetric digital subscriber line (ADSL) architecture.

DSL (digital subscriber line) is a communication technology with underlies ISDN (integrated services digital network) and several variance that make up the x-DSL family of services. These include ADSL (asymmetric DSL), RADSL (rate adaptive DSL), SDSL (symmetric DSL) and VDSL (very high speed DSL).

xDSL provides a digital connection for customers or other end users. By using signaling methods both voice and data can be transmitted over telephone lines wherein the data transmission speed is higher than with ordinary modems.

The DSL technology provides digital access over ordinary telephone lines. ADSL is described in the ANSI T1.413 specification. ADSL supports the analog voice service which is also called plain old telephone service (POTS).

Figure 1:
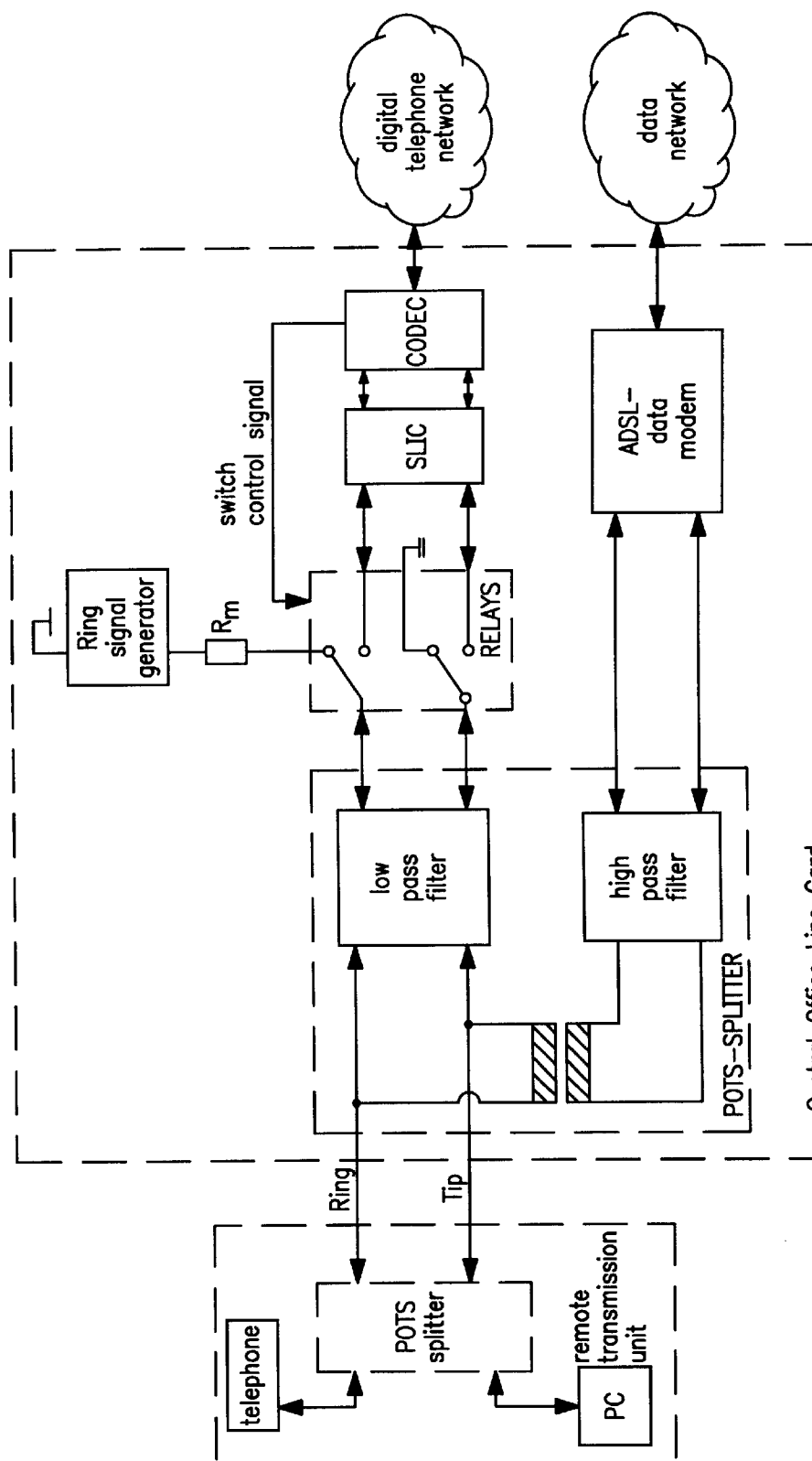

FIG. 1 shows a central office line card within an ADSL system architecture according to the state of the art. A remote transmission unit of a user comprises a POTS splitter for separating a voice signal from a data signal. The POTS splitter of the remote transmission unit is connected to a telephone and to a data terminal such as a personal computer. As can be seen from FIG. 1 the remote transmission unit is connected via a tip-line and a ring-line to the central office line-card within a central office. The central office line-card comprises although a POTS splitter having a low pass filter and a high pass filter. The low pass filter is connected via a POTS-signal-path to a digital telephone network and the high pass filter of the POTS splitter is connected via an ADSL-data-modem to a digital data network. The POTS splitter separates the voice signal having a low frequency from the data signal which has a high frequency.

For establishing a data communication between a first user connected to a digital telephone network and the remove transmission unit of a second user as shown in FIG. 1 the first user dials the telephone number of the second user which is received by a central office line-card within a local central office to which the first user is connected. The first central office line-card detects the incoming call of the first user and signals this call demand to the central office line-card within the local central office of the second user as shown in FIG. 1. The incoming command will e.g. be detected by the CODEC device within the central office line-card which generates a switch control signal for an mechanical relay. The relay switches off the POTS signal path and connects the ring signal generator via a current measuring resistor $R_M$ to the low pass filter within the POTS splitter of the central office line card. The ring signal generator generates a ringing signal having the frequency of approximately 20 to 50 Hz and a high voltage amplitude e.g. 120V (85V rms). This low frequency ringing signal is passed by the low pass filter to the ring line and transmitted via the ring line to the POTS splitter device of the remote transmission unit. The ringing signal received by the remote transmission unit is filtered by the POTS splitter of the remote transmission unit and passed to the telephone of the second user. In case that the second user picks tip the telephone the DC-current flows through the ring line and is detected by the measuring resistor $R_M$. To establish the communication between the two users the relay is then switched back to close the POTS signal path between the subscriber line interface circuit (SLIC) and the low pass filter of the POTS splitter. During the telephone call i.e. the voice data exchange it is possible for the second user to exchange information data via the ADSL-data-modem and the digital data network simultaneously. This is possible because the voice signal and the data signal use different frequency bands.

The relay in the central office line card as shown in FIG. 1 has several disadvantages. A relay has a considerable size and cannot be integrated. A further disadvantage is that the electromechanical relays operate with magnetic fields. These magnetic fields cannot be confined to the relay so that interaction of magnetic fields between adjacent electromagnetic components must be accounted for in the printed circuit bord design. Electromagnetic relays generate electrical and audible noise that can be problematic in printed circuit bord applications. Magnetic relays contain moving parts and are consequently sensitive to physical shock and vibration. A further major disadvantage of electromechanical relays is contact bouncing during the change from one switching position to the other switching position which leads to mechanical aberrations a lower reliability and life time of the mechanical relay. Since electromagnetic relays must energize a coil before switching can take place they have high power consumption and generate a considerable amount of heat.

Figure 2:
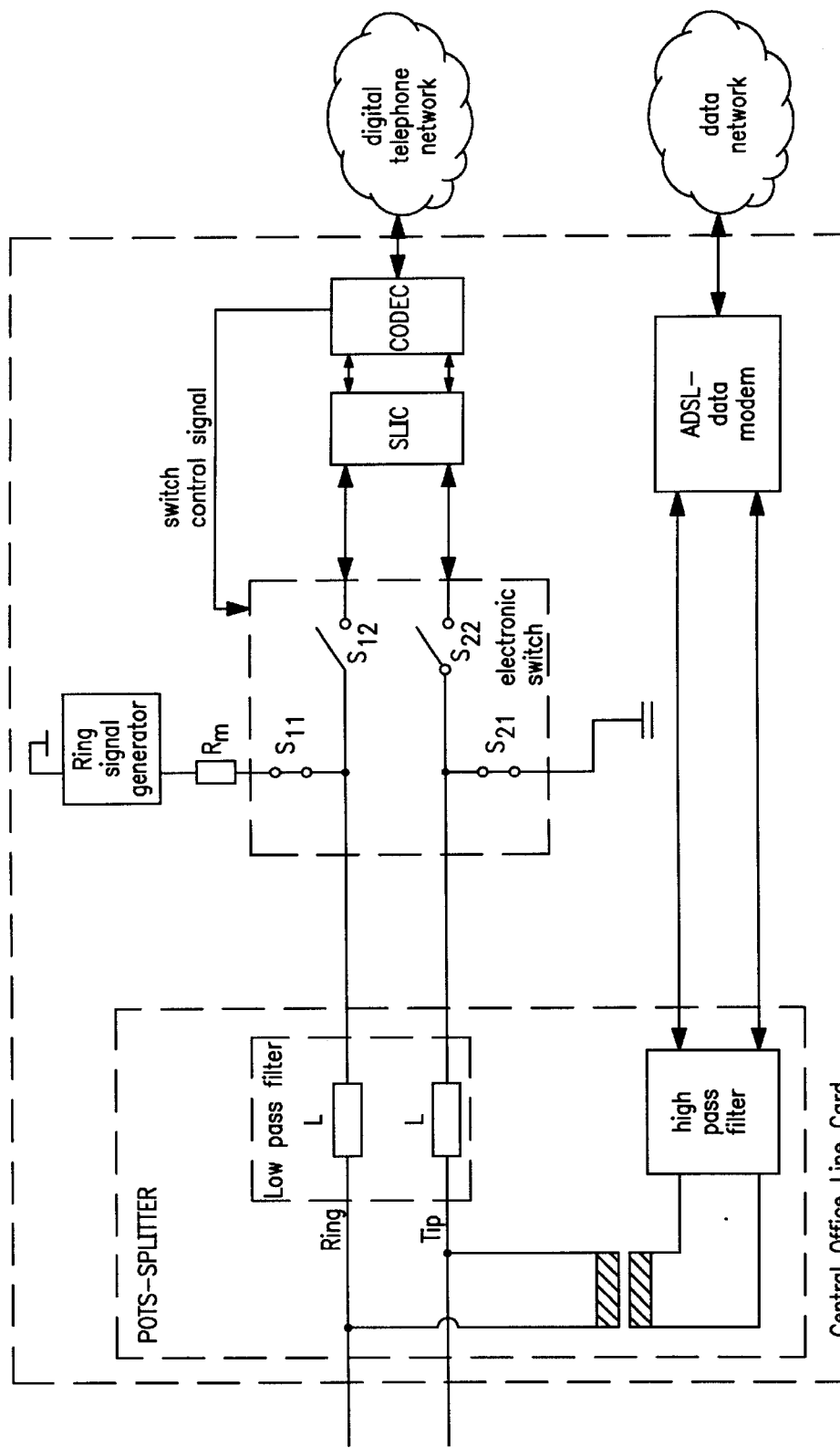

To overcome the above mentioned disadvantages the relay has been replaced in a central office line card according to the state of the art by an electronic switch. FIG. 2 shows a central office line card according to the state of the art comprising an electronic switch instead of a relay. The CODEC-circuit detects the incoming call of a user and controls the electronic switch through a switch control signal. When the CODEC-circuit detects the incoming call command switches $S_{11}$ and $S_{21}$ are closed so that the ringing signal generated by the ring signal generator is applied to the low pass filter. To interrupt the POTS signal path the switches $S_{12}$, $S_{22}$ within the electronic switch are switched off. When the measuring resistor $R_M$ measures the picking up of the telephone by means of the flowing DC current the switches $S_{11}$, $S_{21}$ are switched off and the corresponding switches $S_{12}$, $S_{22}$ are switched on to close the POTS signal path and to establish the voice-communication between the two users.

The low pass filter of POTS-splitter in the central office line card as shown in FIG. 2 is a passive low pass filter having two coils L. The low pass filter has a low filter order so that the SLIC and CODEC-circuit are able so synthesize the required terminating resistance or terminating impedance for different countries. The required terminating impedances for different countries vary, so that for instance the terminating impedance in the United States is different from the terminating impedance in Germany. The synthesized terminating impedance to be accomplished so that the standard for POTS-application e.g. the return loss is not violated. A low pass filter with a low filter order has further advantages in that it is smaller and easier to integrate.

The ring signal generator generates a ringing signal with a high voltage amplitude. Consequently the switch $S_{11}$ has to sustain such a high voltage and is formed normally by a thyristor device. When the thyristor switch $S_{11}$ is switched on and the ringing signal generated by the ringing signal generator is applied to the low pass filter of the POTS-splitter the impedance changes because the impedance of the thyristor switch $S_{11}$ varies when the ringing signal is switched through the thyristor has a high impedance during zero crossing of the ringing signal.

The thyristor switch $S_{11}$ has a non linear switching behavior. For signals greater e.g. than 1 Volt the switching resistance of the thyristor switch $S_{11}$ is less than 10ω and for signals having an amplitude below 1 Volt the resistance increases to several kilo ohms. The non linearity as well as the impedance changes of the switch $S_{11}$ in the central office line card according to the state of the art as shown in FIG. 2 disturb the ADSL data transmission through the POTS splitter. This in return leads to non correctable errors in the data transmission.

Accordingly it is an object of the present invention to provide a POTS-splitter for a central office wherein the ringing signal does not affect the simultaneous data transmission.

This object is achieved by a switchable POTS-splitter having the features of rain claim 1.

The invention provides a switchable POTS-splitter for separating a voice signal from a data signal having
a high pass filter for the data signal and
a low pass filter for the voice signal and for a ringing signal
  which is generated by v ringing signal generator and switched by means of a signal feeding switch to the low pass filter for transmission to a remote transmission unit via a ring line,
  wherein the low pass filter comprises at least one capacitor and a capacitor switch for switching said capacitor to the ring line when the ringing signal is transmitted.

In a preferred embodiment of the switchable POTS-splitter according to the present invention said capacitor switch is an electronic switch controlled by a CODEC-circuit.

This has the advantage that an electronic switch is easy to integrate and can be controlled by a control circuit without additional driver circuits.

In a further preferred embodiment of the swichable POTS-splitter according to the present invention said signal feeding switch is an electronic switch-controlled by a CODEC-circuit.

The signal feeding switch is a thyristor device in a preferred embodiment of the switchable POTS-splitter according to the present invention.

In a further preferred embodiment of the switchable POTS-splitter according to the present invention the low pass filter is a passive filter of low order.

This has the advantage, that the POTS-splitter is operable when there is a power failure.

In a further preferred embodiment of the POTS-splitter according to the present invention the low pass filter includes at least one coil having an inductivety of around 5 mH.

In a further preferred embodiment of the switchable POTS-splitter according to the present invention the at least one capacitor has a capacity of around 100 nF.

The high pass filter is also a passive filter in a preferred embodiment of the POTS-splitter according to the present invention.

The high pass filter is preferably connected to an ADSL-data-modem.

The remote transmission unit is preferably an ADSL-transmission unit having a separate POTS-splitter.

Figure 3:
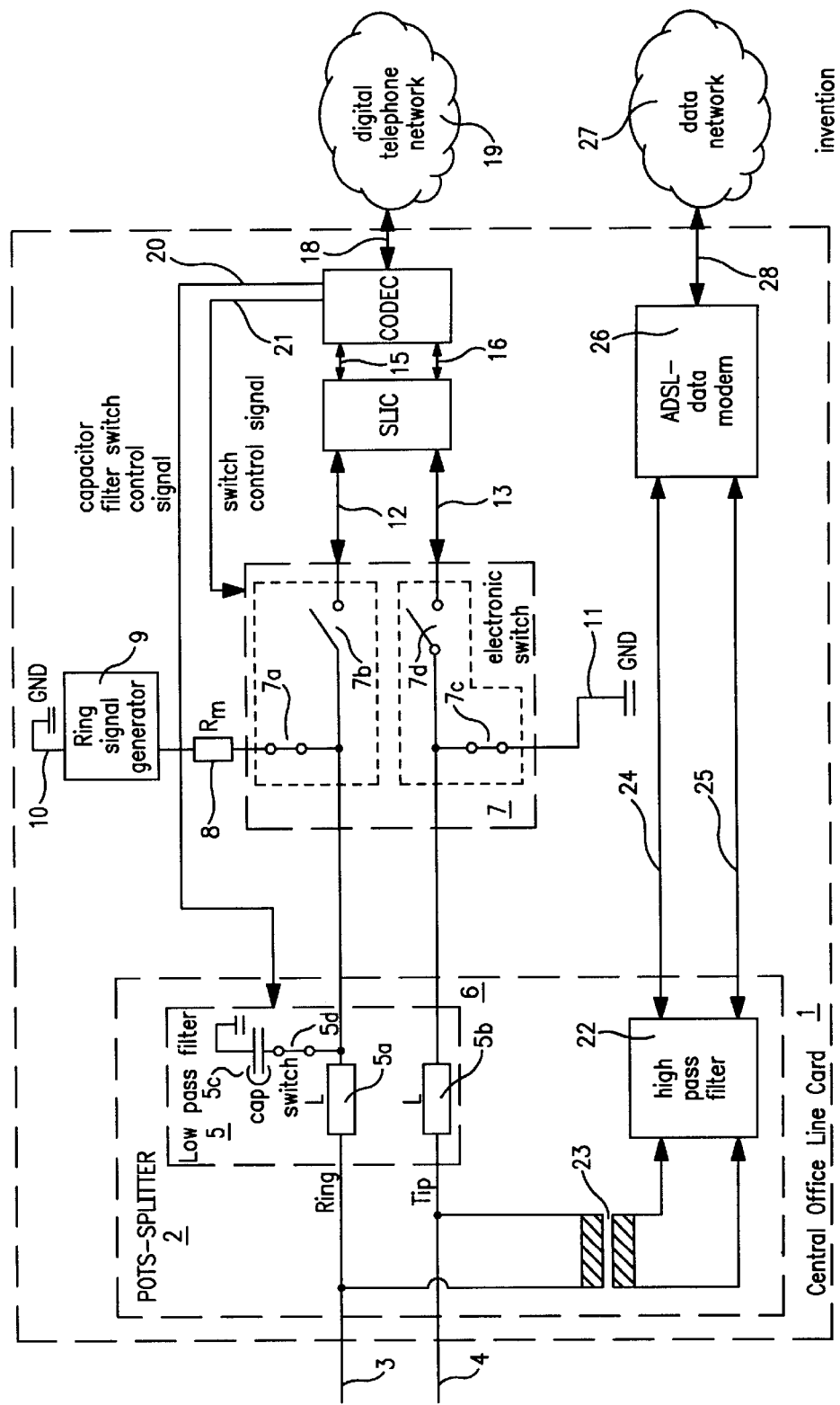

A preferred embodiment of the switchable POTS-splitter according to the present invention is described in the following with reference to the enclosed figures showing:

FIG. 1 a central office line card comprising a POTS-splitter according to the state of the art;

FIG. 2 a further central office line card comprising a POTS-splitter according to the state of the art;

FIG. 3 a central office line card including a switchable POTS-splitter according to a preferred embodiment of the present invention.

As can be seen from FIG. 3 the central office line card 1 includes the switchable POTS-splitter 2 according to the present invention. The POTS-splitter 2 of the central office line card 1 is connected via a ring line 3 and a tip line 4 to a remote transmission unit having a separate POTS splitter to which a telephone and a data terminal is connected. The POTS-splitter 2 includes a low pass filter 5 of low order so that an impedance can be synthesized by the programmable SLIC for any country in the world. The low pass filter 5 is a passive filter including a first coil 5a and a second coil 5b. In a preferred embodiment the inductivity of the coils 5a, 5b is around 5 mHenry. The first coil 5a is connected to the ring line 3 and the second coil 5b is connected to the tip line 4.

The low pass filter 5 according to the preferred embodiment of the present invention as shown in FIG. 3 includes further at least one capacitor 5c and a corresponding capacitor switch 5d for switching the capacitor 5c to the ring line in parallel to a ring signal generator g. The coil 5a connected to the ring line 3 is connected via a signal line 6 to an electronic switch device 7.

The electronic switch device 7 includes four electronic switches 7a, 7b, 7c, 7d. The first switch 7a is a signal feeding switch and connected via a current measuring resistor a to the ring signal generator 9 which is grounded to earth via a line 10. The second electronic switch 7c of the electronic switch device 7 is connected via a line 11 to ground. The electronic switches 7b, 7d are connected via lines 12, 13 to a subscriber line interface circuit (SLIC) 14 which is connected via lines 15, 16 to a CODEC-circuit 17. The codec 17 is a device for converting analog signals to digital signals and vice versa. The CODEC-circuit 17 is connected via a line 18 to a digital telephone network 19 such as an AFM or Frame relay based network so that the voice signals are transmitted over digital lines.

The CODEC-circuit 17 is connected to the low pass filter 5 via a first control line 20. Through the control line 20 the CODEC-circuit 17 sends a capacitor switch control signal to switch on the capacitor switch 5d when the ringing signal generated by the ringing signal generator 9 is applied via the electronic switch 7a and the signal line 6 to the low pass filter 5. The CODEC-circuit 17 is further connected to the electronic switching device 7 by means of a control line 21. When the CODEC-circuit 17 detects a command to establish a voice connection between two users it transmits a switch control signal to the electronic switch device 7 to switch on the electronic switches 7a, 7c and to switch off the switches 7b, 7d. Switches 7a, 7c close the ring signal generator loop and the generated ringing signal is switched to the signal line 6 and applied to the low pass filter 5. The generated ringing signal which has a low frequency is passed by the low pass filter 5 to the ring line 3 to which the remote ADSL-transmission unit is connected. When the switches 7a, 7c of the electronic switch device 7 are closed in reaction to the received switch control signal the CODEC-circuit 17 closes at the same time the capacitor switch 5d to connect the capacitor 5c with the signal line 6.

When the ring signal generator 9 is connected to the signal line 6 the generated ringing signal is applied to the low pass filter 5 wherein the capacitor 5c is switched to the coil 5a by means of the activated capacitor switch 5d.

The POTS-splitter 2 comprises besides the low pass filter 5 a high pass filter 22 which is connected via a transformer 23 to the ring line 3 and the tip line 4. The high pass filter 22 is like the low pass filter 5 a passive filter. The high pass filter 22 is connected via lines 24, 25 to an ADSL-data modem linked to a digital data network 27 through a data transmission line 28.

The POTS-splitter 2 according to the present invention is switchable between to modes. The POTS-splitter 2 is controlled by the CODEC-circuit 17 which applies a capacitor switch control signal to the capacitor switch 5d through line 20.

In a first mode for transmission of the generated ringing signal to the remote transmission unit the capacitor switch 5d is closed or switched on so that the low pass filter 5d has a higher filter order. After the picking up of the telephone by the user has been detected by the current measuring circuit 8 the CODEC-circuit 17 switches the POTS-splitter 2 into the second mode wherein the capacitor switch 5d is switched off to diminish the filter order of the low pass filter 5 and the ring signal generator 9 is disconnected from the POTS-signal path by opening the switches 7a, 7c at the same time. Simultaneously the CODEC-circuit 17 sends a switch control signal via the control signal line 21 to close the switches 7b, 7d so that the voice signal communication between the two users via the digital telephone network 19 is established.

The low pass filter 5 has in the first mode, i.e. when the capacitor switch 5d is closed a higher filter order than in the second mode, i.e. when the capacitor switch 5d is switched off. The lower filter order in the second mode when the voice communication is established makes it possible for the SLIC device 14 and the CODEC-device 17 to synthesize the required terminating impedance for any country. The higher filter order of the low pass filter 5 in the first mode prevents or blocks impedance changes and reduces the effect of non-linearity in the relevant ADSL-frequency band caused by the the thyristor switch 7a when the ringing signal generated by the ring signal generator 9 is applied via the switch 7a to the low pass filter 5. The thyristor switches 7a which is used to switch through the ring signal generator 9 has a high impedance of e.g. 5 kΩ during zero signal crossing and has a low impedance when the ringing signal has reached its maximum. The firing and extinguishing of the thyristor have a non linear behavior. The ADSL signal in the frequency band between 25 kHz and 138 kHz is applied in parallel to the thyristor switch 7a, i.e. a small amount of the signal does not flow to the remote ADSL transmission unit but through to the thyristor switch 7a. With the switchable POTS-splitter 2 according the present invention the ADSL signal is not affected by the impedance changes of the switch 7a because the switchable low pass filter 5 ensures a constant impedance. In the line there is the provided a RC-combination (100 R/9 nF) for stabilizing the SLIC however the impedance of this combination is quiete high (circa 700 R) in the relevant frequency band between 25 kHz and 138 kHz in comparison to the blocking impedance of the switches. By switching the low pass filter capacitor 5c which has a capacity of e.g. 68 nF in parallel to the thyristor switch 7a the impedance can be lowered by a factor of 10 (to approximately 70 R) which is sufficient to achieve the desired lowering of the impedance.

As a consequence the ringing signal generated by the ring signal generator 9 does not disturb the simultaneous data transmission of the ADSL-data modem 26 through the high pass filter 22 of the POTS-splitter 2 to the remote transmission unit which is connected to the POTS splitter 2 via the ring line 3 and the tip line 4. The low pass filter 5 is easy to integrate and functions even if there is a power failure. The electronic switch device 7 is also easy to integrate and has a low power consumption. The switchable POTS-splitter 2 over-comes the limitations of the semiconductor switches 7a–7d caused by the non linearities of semiconductor switches.

What is claimed is:

1. A switchable plain old telephone service-splitter for separating a voice signal from a data signal having (a) high pass filter for the data signal including at least one capacitor;

(b) a low pass filter for the voice signal and for a ringing signal generated by a ringing signal generator, wherein in a first mode said ringing signal is switched to said low pass filter by means of a signal feeding switch for transmission to a remote transmission unit via a ring line and wherein a capacitor switch which is included in said low pass filter is closed for switching said capacitor to said ring line; and wherein in a second mode said signal feeding switch is opened to disconnect said ringing signal generator and said capacitor switch is opened to diminish the filter order of said low pass filter.

2. The switchable plain old telephone service-splitter according to claim 1, wherein said capacitor switch is an electronic switch controlled by a coder/decoder-circuit.

3. The switchable plain old telephone service-splitter according to claim 1, wherein said signal feeding switch is an electronic switch controlled by a coder/decoder-circuit.

4. The switchable plain old telephone service-splitter according to claim 1, wherein said low pass filter is a passive filter of low order.

5. The switchable plain old telephone service-splitter according to claim 1, wherein said low pass filter includes at least one coil having an inductivity in the range from 1 mH to 10 mH.

6. The switchable plain old telephone service-splitter according to claim 1, wherein said at least one capacitor has a capacity in the range from 10 nF to 100 nF.

7. The switchable plain old telephone service-splitter according to claim 1, wherein said high pass filter is a passive filter.

8. The switchable plain old telephone service-splitter according to claim 1, wherein said high pass filter is connected to an asymmetric digital subscriber line-data modem.

9. The switchable plain old telephone service-splitter according to claim 1, wherein said remote transmission unit is an asymmetric digital subscriber line-transmission unit having a separate plain old telephone service-splitter.

* * * * *